United States Patent
Cerny

(10) Patent No.: US 10,102,663 B2
(45) Date of Patent: Oct. 16, 2018

(54) GRADIENT ADJUSTMENT FOR TEXTURE MAPPING FOR MULTIPLE RENDER TARGETS WITH RESOLUTION THAT VARIES BY SCREEN LOCATION

(71) Applicant: Sony Interactive Entertainment LLC, San Mateo, CA (US)

(72) Inventor: Mark Evan Cerny, Burbank, CA (US)

(73) Assignee: SONY INTERACTIVE ENTERTAINMENT LLC, San Mateor, CA (US)

(*) Notice: Subject to any disclaimer, the term of this patent is extended or adjusted under 35 U.S.C. 154(b) by 0 days.

(21) Appl. No.: 15/587,825

(22) Filed: May 5, 2017

(65) Prior Publication Data

US 2017/0243390 A1     Aug. 24, 2017

Related U.S. Application Data

(63) Continuation of application No. 14/246,062, filed on Apr. 5, 2014, now Pat. No. 9,652,882.

(51) Int. Cl.
    *G06T 1/20*        (2006.01)
    *G06T 15/04*      (2011.01)
    (Continued)

(52) U.S. Cl.
    CPC ............... *G06T 15/04* (2013.01); *G06T 1/20* (2013.01); *G06T 15/005* (2013.01); *G06T 15/80* (2013.01); *G06T 17/10* (2013.01); *G09G 5/363* (2013.01); *G06T 2210/36* (2013.01); *G09G 2310/0232* (2013.01); *G09G 2360/08* (2013.01); *G09G 2360/121* (2013.01)

(58) Field of Classification Search
    CPC ....... G06T 15/04; G06T 2210/36; G06T 1/20; G06T 15/005; G06T 15/80; G09G 5/363
    USPC .......................................... 345/419, 582, 426
    See application file for complete search history.

(56) References Cited

U.S. PATENT DOCUMENTS

| | | |
|---|---|---|
| 4,513,317 A | 4/1985 | Ruoff |
| 5,130,794 A | 7/1992 | Ritchey |

(Continued)

FOREIGN PATENT DOCUMENTS

| | | |
|---|---|---|
| JP | 2000155850 A | 6/2000 |
| JP | 2004265413 A | 9/2004 |

(Continued)

OTHER PUBLICATIONS

Co-Pending U.S. Appl. No. 14/246,061, to Tobias Berghoff, filed Apr. 5, 2014.

(Continued)

*Primary Examiner* — Jacinta M Crawford
(74) *Attorney, Agent, or Firm* — JDI Patent; Joshua Isenberg; Robert Pullman

(57) ABSTRACT

In a computer graphics processing unit (GPU) having a shader and a texture unit the pixel shader is configured to receive or generate one or more sets of texture coordinates per pixel sample location. The pixel shader and texture unit between them are configured to calculate texture space gradient values for one or more primitives and generate and apply per-pixel gradient scale factors configured to modify the gradient values to smoothly transition them between regions of a display device having different pixel resolutions.

24 Claims, 4 Drawing Sheets

(51) Int. Cl.
  *G06T 15/00* (2011.01)
  *G06T 15/80* (2011.01)
  *G09G 5/36* (2006.01)
  *G06T 17/10* (2006.01)

(56) References Cited

U.S. PATENT DOCUMENTS

| | | |
|---|---|---|
| 5,224,208 A | 6/1993 | Miller et al. |
| 5,422,653 A | 6/1995 | Maguire |
| 5,602,391 A | 2/1997 | Pines et al. |
| 5,777,913 A | 7/1998 | Rasmusson |
| H1812 H | 11/1999 | Arcuri |
| 6,313,838 B1 | 11/2001 | Deering |
| 6,417,861 B1 | 7/2002 | Deering et al. |
| 6,469,700 B1 | 10/2002 | Munshi et al. |
| 6,476,819 B1 | 11/2002 | Ozawa |
| 6,731,298 B1 | 5/2004 | Moreton et al. |
| 6,804,066 B1 | 10/2004 | Ha et al. |
| 6,906,723 B2 | 6/2005 | Ault |
| 6,967,663 B1 | 11/2005 | Bastos et al. |
| 7,046,245 B2 | 5/2006 | Cerny et al. |
| 7,081,893 B2 | 7/2006 | Cerny |
| 7,161,603 B2 | 1/2007 | Saito et al. |
| 7,336,277 B1 | 2/2008 | Clark et al. |
| 7,339,594 B1 * | 3/2008 | Newhall, Jr. ......... G06T 11/001 345/582 |
| 7,355,604 B2 | 4/2008 | Bando et al. |
| 7,426,724 B2 | 9/2008 | Kilgard et al. |
| 7,511,717 B1 | 3/2009 | Bastos et al. |
| 7,786,993 B2 | 8/2010 | Cerny et al. |
| 7,876,332 B1 | 1/2011 | Donham et al. |
| 7,907,792 B2 | 3/2011 | Harville |
| 7,916,155 B1 | 3/2011 | Moreton |
| 8,031,192 B2 | 10/2011 | Cerny |
| 8,044,956 B1 | 10/2011 | Kilgard |
| 8,090,383 B1 | 1/2012 | Emigh et al. |
| 8,144,156 B1 | 3/2012 | Baldwin |
| 8,149,242 B2 | 4/2012 | Langyel et al. |
| 8,174,527 B2 | 5/2012 | Cerny et al. |
| 8,207,975 B1 | 6/2012 | Molnar et al. |
| 8,228,328 B1 | 7/2012 | French et al. |
| 8,233,004 B1 | 7/2012 | Molnar et al. |
| 8,300,059 B2 * | 10/2012 | Isidoro ................... G06T 15/04 345/582 |
| 8,581,929 B1 | 11/2013 | Maguire |
| 8,643,644 B2 | 2/2014 | Wei et al. |
| 8,669,999 B2 | 3/2014 | Donovan et al. |
| 9,316,834 B2 | 4/2016 | Makino et al. |
| 9,495,790 B2 | 11/2016 | Cerny |
| 2002/0057279 A1 | 5/2002 | Jouppi |
| 2003/0086603 A1 | 5/2003 | Davidson et al. |
| 2003/0112238 A1 | 6/2003 | Cerny et al. |
| 2003/0112240 A1 | 6/2003 | Cerny |
| 2003/0122833 A1 | 7/2003 | Doyle |
| 2003/0234784 A1 | 12/2003 | Grzeszczuk et al. |
| 2004/0036692 A1 | 2/2004 | Alcorn et al. |
| 2004/0169663 A1 | 9/2004 | Bernier |
| 2004/0212619 A1 | 10/2004 | Saito et al. |
| 2004/0227703 A1 | 11/2004 | Lamvik et al. |
| 2005/0017983 A1 | 1/2005 | Liao et al. |
| 2005/0225670 A1 | 10/2005 | Wexler et al. |
| 2006/0001674 A1 | 1/2006 | Cerny et al. |
| 2006/0077209 A1 | 4/2006 | Bastos et al. |
| 2006/0256112 A1 | 11/2006 | Heirich et al. |
| 2006/0277520 A1 | 12/2006 | Gennari |
| 2007/0002049 A1 | 1/2007 | Cerny |
| 2007/0018988 A1 | 1/2007 | Guthe |
| 2007/0165035 A1 | 7/2007 | Duluk et al. |
| 2007/0183649 A1 | 8/2007 | Kiefer et al. |
| 2008/0062164 A1 | 3/2008 | Bassi et al. |
| 2008/0106489 A1 | 5/2008 | Brown et al. |
| 2008/0113792 A1 | 5/2008 | Yamada et al. |
| 2008/0129748 A1 | 6/2008 | Bakalash et al. |
| 2009/0002380 A1 | 1/2009 | Langyel et al. |
| 2009/0033659 A1 | 2/2009 | Lake et al. |
| 2009/0141033 A1 | 6/2009 | Street |
| 2010/0002000 A1 | 1/2010 | Everitt et al. |
| 2010/0007662 A1 | 1/2010 | Cox et al. |
| 2010/0104162 A1 | 4/2010 | Falk et al. |
| 2010/0110102 A1 | 5/2010 | Nystad et al. |
| 2010/0156919 A1 | 6/2010 | Bala et al. |
| 2010/0214294 A1 | 8/2010 | Li et al. |
| 2010/0283783 A1 | 11/2010 | Cerny et al. |
| 2011/0090242 A1 | 4/2011 | Cote et al. |
| 2011/0090250 A1 | 4/2011 | Molnar et al. |
| 2011/0134136 A1 * | 6/2011 | Seiler ..................... G06T 5/002 345/582 |
| 2011/0188744 A1 | 8/2011 | Sun |
| 2011/0216069 A1 | 9/2011 | Keall et al. |
| 2012/0014576 A1 | 1/2012 | Olson et al. |
| 2012/0069021 A1 | 3/2012 | Son et al. |
| 2012/0092366 A1 | 4/2012 | Smithers et al. |
| 2012/0206452 A1 | 8/2012 | Geisner et al. |
| 2012/0293486 A1 | 11/2012 | Adachi |
| 2012/0293519 A1 | 11/2012 | Ribble et al. |
| 2013/0021358 A1 | 1/2013 | Nordlund et al. |
| 2013/0063440 A1 | 3/2013 | Son et al. |
| 2013/0093766 A1 | 4/2013 | Hutchins et al. |
| 2013/0114680 A1 | 5/2013 | Leontaris et al. |
| 2013/0120380 A1 | 5/2013 | Kallio et al. |
| 2013/0141445 A1 | 6/2013 | Engh-Halstvedt et al. |
| 2013/0265309 A1 | 10/2013 | Goel et al. |
| 2013/0300740 A1 | 11/2013 | Snyder et al. |
| 2013/0342547 A1 | 12/2013 | Lum et al. |
| 2014/0049549 A1 | 2/2014 | Lukyanov et al. |
| 2014/0063016 A1 | 3/2014 | Howson et al. |
| 2014/0362081 A1 | 12/2014 | Cerny et al. |
| 2014/0362100 A1 | 12/2014 | Cerny et al. |
| 2014/0362101 A1 | 12/2014 | Cerny et al. |
| 2014/0362102 A1 | 12/2014 | Cerny et al. |
| 2015/0089367 A1 | 3/2015 | Dodge et al. |
| 2015/0287158 A1 | 10/2015 | Cerny et al. |
| 2015/0287166 A1 | 10/2015 | Cerny |
| 2015/0287167 A1 | 10/2015 | Cerny |
| 2015/0287230 A1 | 10/2015 | Cerny |
| 2015/0287232 A1 | 10/2015 | Cerny |
| 2016/0246323 A1 | 8/2016 | Cerny et al. |
| 2017/0031732 A1 | 2/2017 | Cerny et al. |
| 2017/0031834 A1 | 2/2017 | Cerny et al. |
| 2017/0061671 A1 | 3/2017 | Cerny |
| 2017/0123961 A1 | 5/2017 | Cerny et al. |

FOREIGN PATENT DOCUMENTS

| | | |
|---|---|---|
| JP | 2006293627 A | 10/2006 |
| JP | 2008233765 A | 10/2008 |
| JP | 2009116550 A | 5/2009 |
| JP | 2013137756 A | 7/2013 |
| KR | 20130029149 A | 3/2013 |
| TW | I250785 B | 3/2006 |
| TW | 200919376 A | 5/2009 |
| TW | 201001329 A | 1/2010 |
| TW | 201143466 A | 12/2011 |
| WO | 2010111258 A1 | 9/2010 |
| WO | 2013076994 A1 | 5/2013 |
| WO | 2013076994 A9 | 4/2014 |

OTHER PUBLICATIONS

U.S. Appl. No. 14/246,062, to Mark Evan Cerny, filed Apr. 5, 2014.
Co-Pending U.S. Appl. No. 14/246,063, to Mark Evan Cerny, filed Apr. 5, 2014.
Co-Pending U.S. Appl. No. 14/246,064, to Tobias Berghoff, filed Apr. 5, 2014.
Co-Pending U.S. Appl. No. 14/246,066, to Mark Evan Cerny, filed Apr. 5, 2014.
Co-Pending U.S. Appl. No. 14/246,067, to Tobias Berghoff, filed Apr. 5, 2014.
Co-Pending U.S. Appl. No. 14/246,068, to Mark Evan Cerny, filed Apr. 5, 2014.
Final Office Action for U.S. Appl. No. 14/246,061, dated Apr. 7, 2017.

(56) References Cited

OTHER PUBLICATIONS

Final Office Action for U.S. Appl. No. 14/246,061, dated Jun. 17, 2016.
Final Office Action for U.S. Appl. No. 14/246,062, dated Jul. 15, 2016.
Final Office Action for U.S. Appl. No. 14/246,063, dated Jun. 21, 2016.
Final Office Action for U.S. Appl. No. 14/246,064, dated Jul. 11, 2016.
Final Office Action for U.S. Appl. No. 14/246,064, dated May 5, 2017.
Final Office Action for U.S. Appl. No 14/246,066, dated Apr. 7, 2017.
Final Office Action for U.S. Appl. No. 14/246,066, dated Jul. 20, 2016.
Final Office Action for U.S. Appl. No. 14/246,067, dated Jun. 17, 2016.
International Search Report and Written Opinion for International Application No. PCT/US2015/024303, dated Jul. 1, 2015.
International Search Report and Written Opinion for International Application No. PCT/US2015/21951, dated Jul. 1, 2015.
International Search Report and Written Opinion for International Application No. PCT/US2015/21956, dated Jul. 1, 2015.
International Search Report and Written Opinion for International Application No. PCT/US2015/21971, dated Jul. 1, 2015.
International Search Report and Written Opinion for International Application No. PCT/US2015/21978, dated Jul. 1, 2015.
International Search Report and Written Opinion for International Application No. PCT/US2015/21984, dated Jul. 1, 2015.
International Search Report and Written Opinion for International Application No. PCT/US2015/21987, dated Jul. 1, 2015.
International Search Report and Written Opinion for International Application No. PCT/US201521982, dated Jul. 1, 2015.
John D. Owens, Mike Houston, David Luebke, Simon Green, John E. Stone, and James C. Phillips, "GPU Computing", Proceeding of IEEE, May 2008, p. 879-899.
Matthaus G. Chajdas, Morgan McGuire, David Luebke; "Subpixel Reconstruction Antialiasing for Deferred Shading" in i3D, Feb. 2011.
Non-Final Office Action for U.S. Appl. No. 15/587,825, dated Jun. 30, 2017.
Non-Final Office Action for U.S. Appl. No. 14/246,061, dated Jan. 4, 2016.
Non-Final Office Action for U.S. Appl. No. 14/246,062, dated Jan. 14, 2016.
Non-Final Office Action for U.S. Appl. No. 14/246,063, dated Jan. 4, 2016.
Non-Final Office Action for U.S. Appl. No. 14/246,063, dated Nov. 23, 2016.
Non-Final Office Action for U.S. Appl. No. 14/246,064, dated Dec. 8, 2016.
Non-Final Office Action for U.S. Appl. No. 14/246,064, dated Feb. 1, 2015.
Non-Final Office Action for U.S. Appl. No. 14/246,066, dated Dec. 30, 2016.
Non-Final Office Action for U.S. Appl. No. 14/246,066, dated Feb. 5, 2016.
Non-Final Office Action for U.S. Appl. No. 14/246,067, dated Jan. 22, 2016.
Non-Final Office Action for U.S. Appl. No. 14/246,067, dated Oct. 27, 2016.
Non-Final Office Action for U.S. Appl. No. 14/246,068, dated Jan. 14, 2016.
Non-Final Office Action for U.S. Appl. No. 14/678,445, dated Dec. 30, 2016.
Non-Final Office Action for U.S. Appl. No. 14/246,061, dated Oct. 20, 2016.
Non-Final Office Action for U.S. Appl. No. 15/351,310, dated Feb. 6, 2017.
Notice of Allowance for U.S. Appl. No. 15/351,310, dated Jun. 5, 2017.
Notice of Allowance for U.S. Appl. No. 14/246,062, dated Jan. 4, 2017.
Notice of Allowance for U.S. Appl. No. 14/246,063, dated Mar. 14, 2017.
Notice of Allowance for U.S. Appl. No. 14/246,067, dated Mar. 16, 2017.
Notice of Allowance for U.S. Appl. No. 14/246,068, dated Jul. 15, 2016.
Taiwan Office Action for TW Application No. 104108777, dated Jun. 27, 2016.
Taiwanese Office Action for TW Application No. 104108773, dated Dec. 22, 2015.
Taiwanese Office Action for TW Application No. 104108774, dated Sep. 12, 2016.
Extended European Search Report dated Aug. 29, 2017 for EP Application No. 15773477.3.
Extended European search report dated Sep. 22, 2017 for European Patent Application No. 15772568.0.
Extended European Search Report dated Oct. 2, 2017 for European patent application EP15773048.
Extended European Search Report dated Sep. 22, 2017 for EP Application No. 15772990.
International Search Report and Written Opinion for International Application No. PCT/US2015021982, dated Nov. 30, 2017.
Jacob Munkberg et al: "Hierarchical stochastic motion blur rasterization", High Performance Graphics, Association for Computing Machinery, Inc., Aug. 5, 2011 (Aug. 5, 2011), pp. 107-118.
Kayvon Fatahalian et al: "Reducing shading on GPUs using quad-fragment merging", ACM Transactions on Graphics US, vol. 29 , No. 4, Jul. 26, 2010 pp. 1-8 , XP058157954, ISSN: 0730-0301.
Marries Van De Hoef et al: "Comparison of mutiple rendering techniques", Jun. 4, 2010 (Jun. 9, 2010).
Non-final Office Action dated Aug. 24, 2017 for U.S. Appl. No. 14/246,061.
Non-Final Office Action for U.S. Appl. No. 15/717,041, dated Dec. 14, 2017.
Notice of Allowance dated Aug. 4, 2017 for U.S. Appl. No. 14/246,066.
Notification of Reason(s) for Refusal dated Sep. 12, 2017 for Japanese Patent application No. 2016-559961.
Office Action dated Aug. 1, 2017 for Korean Patent Application No. 0-2016-7027635.
Office Action dated Aug. 29, 2017 for TW Application No. 105138883.
Office Action dated Oct. 3, 2017 for JP Application No. 2016-560398.
Office Action dated Oct. 31, 2017 for Japan Patent Application 2016-560646.
Office Action dated Sep. 5, 2017 for Japanese Patent Application No. 2016-560642.
Scott Kircher et al: "Inferred lighting: fast dynamic lighting and shadows for opaque and translucent objects", Sandbox 2009: Proceedings ; 4th ACM SIGGRAPH Symposium on Video Games ; New Orleans , Louisiana , Aug. 4-6, 2009 , ACM, New York, NYRetrieved from the Internet: URL:http://dl.acm.org/ft_gateway.cfm?id=1581080&ftid=658593&dwn=I&CFID=587315678&CFTOKEN=20408680.
Shirman et al, "A new look at mipmap level estimation techniques", Computers and Graphics , Elsevier, GB , vol. 23 , No. 2, Apr. 1, 1999 (Apr. 1999) , pp. 223-231 , XP004165786 , ISSN: 0097-8493.
Steve Marschner et al: "Geometry-Aware Framebuffer, Level of Detail", Eurographics Symposium on Rendering 2008, Jan. 1, 2008 (Jan. 1, 2008) , XP055239091, Retrieved from the Internet: URL:https://www.cs.virginia.edu/~jdl/papers/resize/yang_egsr08.pdf.
Notification of Reason(s) for Refusal dated Feb. 6, 2018 for Japanese Patent application No. 2016-560652.
Notification of Reason(s) for Refusal dated Feb. 6, 2018 for Japanese Patent application No. 2016-560826.
Office Action dated Jan. 9, 2018 for Taiwan Patent Application No. 104108773.
Final Office Action for U.S. Appl. No. 15/717,041, dated Apr. 18, 2018.

(56) References Cited

OTHER PUBLICATIONS

Office Action dated Apr. 26, 2018 for Korean Patent Application No. 10-2016-7027105.
Office Action dated Apr. 26, 2018 for Korean Patent Application No. 10-2016-7027106.
Office Action dated May 28, 2018 for Korean Patent Application No. 2016-7027633.
Non-Final Action for U.S. Appl. No. 15/652,134, dated Aug. 24, 2018.
Notice of Allowance dated Jul. 17, 2018 for U.S. Appl. No. 15/717,041.
Office Action dated Jul. 26, 2018 for Korean patent application No. 10-2016-7031094.

* cited by examiner

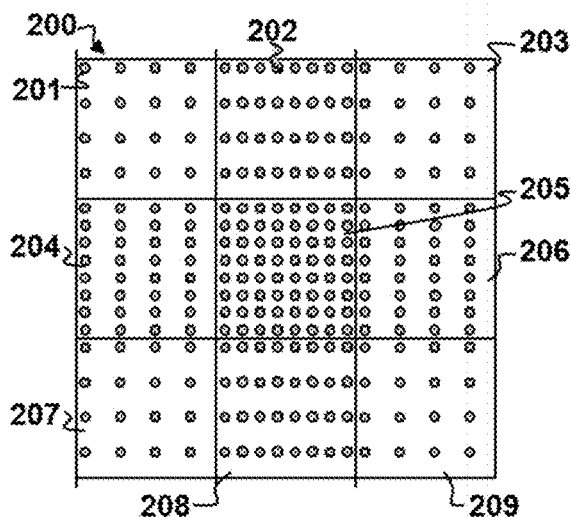 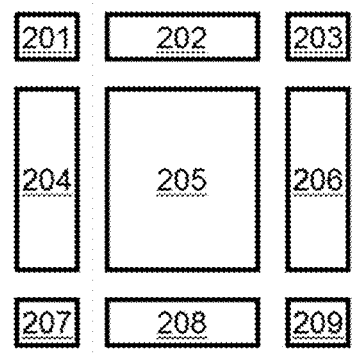
FIG. 2A  FIG. 2B
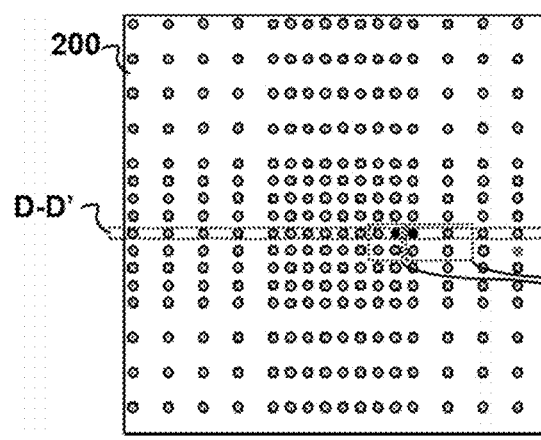
FIG. 2C
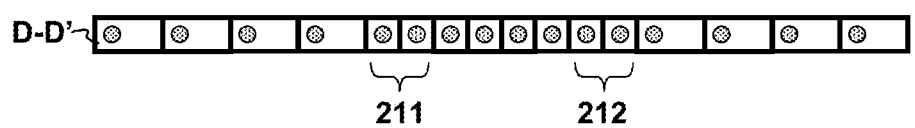
FIG. 2D

GRADIENT ADJUSTMENT FOR TEXTURE MAPPING FOR MULTIPLE RENDER TARGETS WITH RESOLUTION THAT VARIES BY SCREEN LOCATION

CLAIM OF PRIORITY

This application is a continuation of and claims the benefit of priority from co-pending application Ser. No. 14/246,062, filed, Apr. 5, 2014 the entire disclosures of which are incorporated herein by reference.

CROSS-REFERENCE TO RELATED APPLICATIONS

This application is related to commonly-assigned, co-pending U.S. patent application Ser. No. 14/246,064 to Tobias Berghoff, entitled "METHOD FOR EFFICIENT CONSTRUCTION OF HIGH RESOLUTION DISPLAY BUFFERS", filed Apr. 5, 2014, the entire contents of which are herein incorporated by reference.

This application is related to commonly-assigned, co-pending U.S. patent application Ser. No. 14/246,067, to Tobias Berghoff, entitled "GRAPHICS PROCESSING ENHANCEMENT BY TRACKING OBJECT AND/OR PRIMITIVE IDENTIFIERS", filed Apr. 5, 2014, the entire contents of which are herein incorporated by reference.

This application is related to commonly-assigned, co-pending U.S. patent application Ser. No. 14/246,068, to Mark Evan Cerny, entitled "GRADIENT ADJUSTMENT FOR TEXTURE MAPPING TO NON-ORTHONORMAL GRID", filed Apr. 5, 2014, the entire contents of which are herein incorporated by reference.

This application is related to commonly-assigned, co-pending U.S. patent application Ser. No. 14/246,061, to Tobias Berghoff, entitled "VARYING EFFECTIVE RESOLUTION BY SCREEN LOCATION BY CHANGING ACTIVE COLOR SAMPLE COUNT WITHIN MULTIPLE RENDER TARGETS", filed Apr. 5, 2014, the entire contents of which are herein incorporated by reference.

This application is related to commonly-assigned, co-pending U.S. patent application Ser. No. 14/246,063, to Mark Evan Cerny, entitled "VARYING EFFECTIVE RESOLUTION BY SCREEN LOCATION BY ALTERING RASTERIZATION PARAMETERS", filed Apr. 5, 2014, the entire contents of which are herein incorporated by reference.

This application is related to commonly-assigned, co-pending U.S. patent application Ser. No. 14/246,066, to Mark Evan Cerny, entitled "VARYING EFFECTIVE RESOLUTION BY SCREEN LOCATION IN GRAPHICS PROCESSING BY APPROXIMATING PROJECTION OF VERTICES ONTO CURVED VIEWPORT", filed Apr. 5, 2014, the entire contents of which are herein incorporated by reference.

FIELD OF THE DISCLOSURE

Aspects of the present disclosure are related to computer graphics. In particular, the present disclosure is related to adjustment of gradients used for texture mapping.

BACKGROUND

Graphics processing typically involves coordination of two processors, a central processing unit (CPU) and a graphics processing unit (GPU). The GPU is a specialized electronic circuit designed to accelerate the creation of images in a frame buffer intended for output to a display. GPUs are used in embedded systems, mobile phones, personal computers, tablet computers, portable game devices, workstations, and game consoles. A GPU is typically designed to be efficient at manipulating computer graphics. GPU's often have a highly parallel processing architecture that makes the GPU more effective than a general-purpose CPU for algorithms where processing of large blocks of data is done in parallel.

The CPU may send the GPU instructions, commonly referred to as draw commands, that instruct the GPU to implement a particular graphics processing task, e.g. render a particular texture that has changed with respect to a previous frame in an image. These draw commands may be coordinated by the CPU with a graphics application programming interface (API) in order to issue graphics rendering commands that correspond to the state of the particular application's virtual environment.

In order to render textures for a particular program, a GPU may perform a series of processing tasks in a "graphics pipeline" to translate the visuals in the virtual environment into images that can be rendered onto a display. A typical graphics pipeline may include performing certain rendering or shading operations on virtual objects in the virtual space, transformation and rasterization of the virtual objects in the scene to produce pixel data suitable for output display, and additional rendering tasks on the pixels (or fragments) before outputting the rendered image on a display.

Virtual objects of an image are often described in virtual space in terms of shapes known as primitives, which together make the shapes of the objects in the virtual scene. For example, objects in a three-dimensional virtual world to be rendered may be reduced to a series of distinct triangle primitives having vertices defined in terms of their coordinates in three-dimensional space, whereby these polygons make up the surfaces of the objects. Each polygon may have an associated index that can be used by the graphics processing system to distinguish a given polygon from other polygons. Likewise, each vertex may have an associated index that can be used to distinguish a given vertex from other vertices. A graphics pipeline may perform certain operations on these primitives to produce visuals for the virtual scene and transform this data into a two-dimensional format suitable for reproduction by the pixels of the display. The term graphics primitive information (or simply "primitive information"), as used herein, is used to refer to data representative of a graphics primitive. Such data includes, but is not limited to, vertex information (e.g., data representing vertex positions or vertex indices) and polygon information, e.g., polygon indices and information that associates particular vertices with particular polygons.

A GPU may perform rendering tasks of the graphics pipeline by implementing programs commonly known as shaders. A typical graphics pipeline may include vertex shaders, which may manipulate certain properties of the primitives on a per-vertex basis, as well as pixel shaders (also known as "fragment shaders"), which operate downstream from the vertex shaders in the graphics pipeline and may manipulate certain values on a per-pixel basis before transmitting the pixel data to a display. The fragment shaders may manipulate values relevant to applying textures to primitives. The pipeline may also include other shaders at various stages in the pipeline, such as geometry shaders that use the output of the vertex shaders to generate a new set of primitives, as well as compute shaders (CS) which may be implemented by a GPU to perform certain other general computational tasks.

Part of the process of mapping textures to primitives involves calculating gradients in texture space from pixel locations in screen space. The gradient calculation often assumes that the pixel locations are based on a square orthonormal grid.

It is within this context that the present disclosure arises.

BRIEF DESCRIPTION OF THE DRAWINGS

The teachings of the present disclosure can be readily understood by considering the following detailed description in conjunction with the accompanying drawings, in which:

FIGS. 2A-2D depict a portion of a display having regions of differing resolution accordance with an aspect of the present disclosure.

DESCRIPTION OF THE DRAWINGS

Figure 1A:
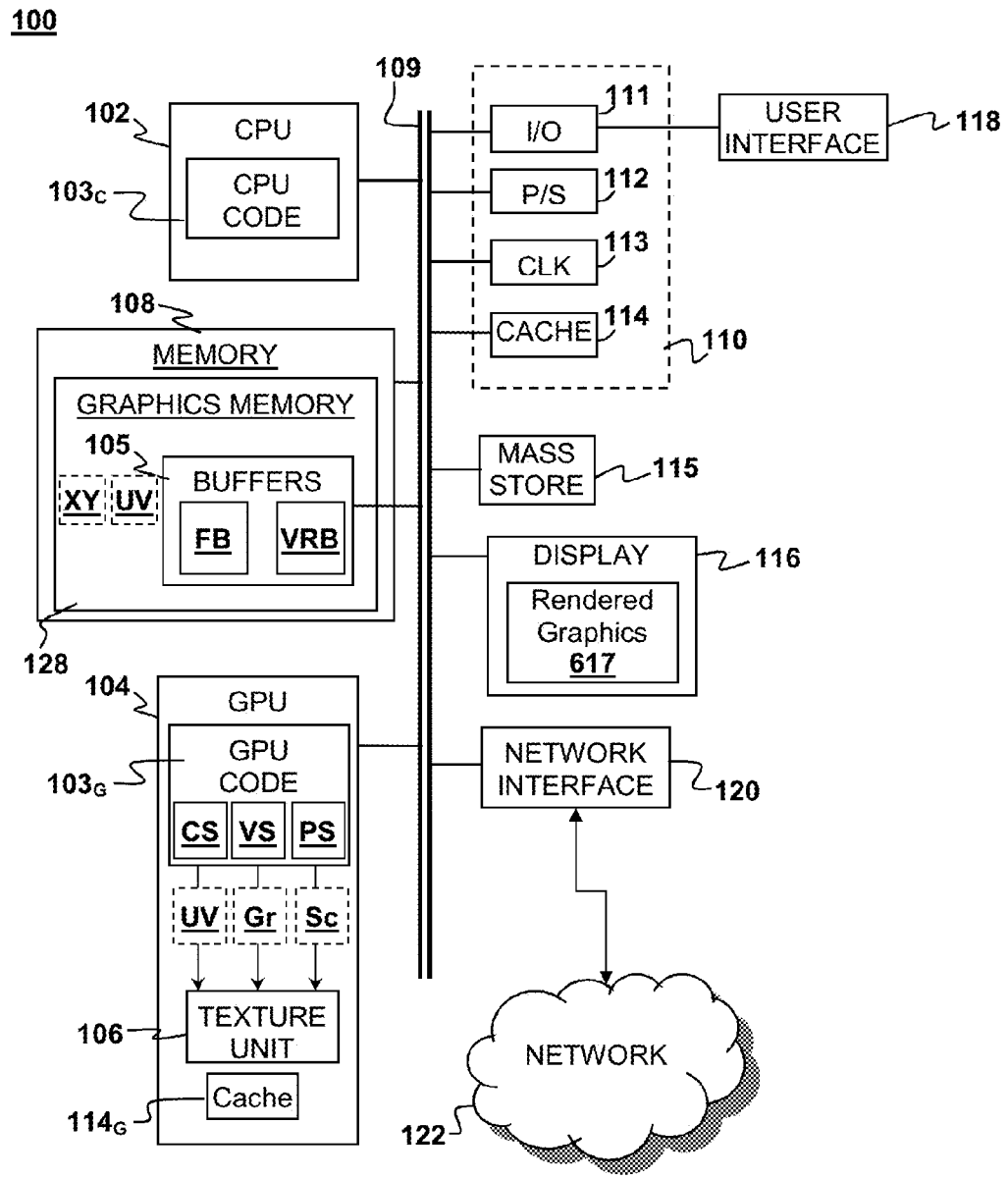
FIG. 1A is a block diagram of a graphics processing system in accordance with aspects of the present disclosure.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

In certain graphics applications bitmapped textures are "painted" onto the polygon. In such a case each pixel value drawn by the output device is determined from one or more pixels sampled from the texture. As used herein, a bitmap generally refers to a data file or structure representing a generally rectangular grid of pixels, or points of color, on a computer monitor, paper, or other display device. The color of each pixel is individually defined. For example, a colored pixel may be defined by three bytes—one byte each for red, green and blue. A bitmap typically corresponds bit for bit with data formats supported by device texture sampling units, which may typically include a range of options including various bit depths per channel or block compression, probably in the same format as it would be stored in the display's video memory or maybe as a device independent bitmap. A bitmap is characterized by the width and height of the image in pixels and the number of bits per pixel, which determines the number of colors it can represent.

The process of transferring a texture bitmap to a surface often involves the use of texture MIP maps (also known as mipmaps). The letters "MIP" in the name are an acronym of the Latin phrase multum in parvo, meaning "much in a small space". Such mipmaps are pre-calculated, optimized collections of bitmap images that accompany a main texture, intended to increase rendering speed and reduce aliasing artifacts.

Each bitmap image of the mipmap set is a version of the main texture, but at a certain reduced level of detail (LOD). Although the main texture would still be used when the view is sufficient to render it in full detail, the graphics hardware rendering the final image switches to a suitable mipmap level (or interpolates between the two nearest levels) when the texture is viewed from a distance, or at a small size. Rendering speed increases since the number of texture pixels ("texels") being processed can be much lower and their distribution in memory more coherent than with simple textures. Artifacts may be reduced since the mipmap images are effectively already anti-aliased, taking some of the burden off the real-time rendering hardware.

The blending between mipmap levels typically involves some form of texture filtering. As used herein, texture filtering refers to a method used to map texels (pixels of a texture) to points on a 3D object. A simple texture filtering algorithm may take a point on an object and look up the closest texel to that position. The resulting point then gets its color from that one texel. This simple technique is sometimes referred to as nearest neighbor filtering. More sophisticated techniques combine more than one texel per point. The most often used algorithms in practice are bilinear filtering and trilinear filtering using mipmaps. Anisotropic filtering and higher-degree methods, such as quadratic or cubic filtering, result in even higher quality images.

Textures are typically square and have side lengths equal to a power of 2. If, e.g., a texture has a basic size of 256 by 256 pixels, then the associated mipmap set may contain a series of 8 images, each half the size of the previous one: 128×128 pixels, 64×64, 32×32, 16×16, 8×8, 4×4, 2×2, and 1×1 (a single pixel). If, for example, this texture is mapped onto a 40×40 pixel portion of a screen space, then an interpolation of the 64×64 and the 32×32 mipmaps would be used. As used herein the term "screen space" refers generally to the set of coordinates used by the display buffer in the graphics pipeline.

The key operation in the process of determining the appropriate mipmap level involves determining the area covered in texture coordinate space (sometimes referred to as UV coordinate space) for a corresponding area of pixel locations from screen space (sometimes referred to as XY coordinate space). In general terms, screen space gradients of interpolated or computed texture UV coordinates are calculated from U and V values sampled at XY space pixel locations in the relevant portion of the scene. In some implementations, a texture coordinate gradient is determined for each screen space direction X and Y by calculating the change in texture coordinates occurring when the screen X coordinate changes and the screen Y is fixed (sometimes referred to as du_dx, dv_dx) and the change in texture coordinates occurring when the screen Y coordinate changes and the screen X is fixed (sometimes referred to as du_dy, dv_dy). This texture coordinate gradient calculation may optionally include corrections for non-orthonormality of the sample grid. For non-anisotropic texture lookups, the gradient with the larger magnitude among these two is used to select level of detail (LOD). For anistropic texturing, the smaller magnitude gradient is used to select the LOD, and the texture is sampled in a line corresponding to the larger magnitude gradient.

Also note that the above calculation can be generalized to 1, 2, 3, or more texture coordinate dimensions. Typical hardware calculates a 1D gradient in U-space or a 2D gradient in UV-space or a 3D gradient in UVW-space depending on the texture dimensionality. Thus, aspects of the present disclosure are not limited to implementations involving two texture coordinate dimensions.

The process of determining the appropriate MIP level of detail is, however, based on an assumption that the relevant portion of the virtual space onto which the texture to be applied is a regular arrangement of samples, i.e., the sample points within screen pixels are evenly spaced across the entirety of screen space in the vertical and horizontal directions. However, visual artifacts can arise from discontinuities in the sample pattern, for instance at a boundary between screen areas having different sample spacing in screen space. At such boundaries, locally correct texture filtering on either side of the boundary may access significantly different MIP levels of detail, producing a noticeable change in the appearance of the output image across the boundary. In such situations, the gradients must be adjusted on each side of the boundary in order to produce smoothly varying texture filtering and thereby reduce the visibility of the boundary.

System and Apparatus

Aspects of the present disclosure include graphics processing systems that are configured to implement gradient adjustment in texture mapping. By way of example, and not by way of limitation, FIG. 1A illustrates a block diagram of a computer system 100 that may be used to implement graphics processing according to aspects of the present disclosure. According to aspects of the present disclosure, the system 100 may be an embedded system, mobile phone, personal computer, tablet computer, portable game device, workstation, game console, and the like.

The system 100 generally may include a central processor unit (CPU) 102, a graphics processor unit (GPU) 104, and a memory 108 that is accessible to both the CPU and GPU. The CPU 102 and GPU 104 may each include one or more processor cores, e.g., a single core, two cores, four cores, eight cores, or more. The memory 108 may be in the form of an integrated circuit that provides addressable memory, e.g., RAM, DRAM, and the like. The memory 108 may include graphics memory 128 that may store graphics resources and temporarily store graphics buffers 105 of data for a graphics rendering pipeline. The graphics buffers 105 may include, e.g., vertex buffers for storing vertex parameter values, index buffers for holding vertex indices, depth buffers (e.g., Z-buffers) for storing depth values of graphics content, stencil buffers, frame buffers for storing completed frames to be sent to a display, and other buffers. In the example shown in FIG. 1A, the graphics memory 128 is shown as part of the main memory. In alternative implementations, the graphics memory could be a separate component, possibly integrated into the GPU 104.

By way of example, and not by way of limitation, the CPU 102 and GPU 104 may access the memory 108 using a data bus 109. In some cases, it may be useful for the system 100 to include two or more different buses. The memory 108 may contain data that can be accessed by the CPU 102 and GPU 104. The GPU 104 may include a plurality of compute units configured to perform graphics processing tasks in parallel. Each compute unit may include its own dedicated local memory store, such as a local data share.

The CPU may be configured to execute CPU code $103_C$, which may include an application that utilizes graphics, a compiler and a graphics API. The graphics API can be configured to issue draw commands to programs implemented by the GPU. The CPU code $103_C$ may also implement physics simulations and other functions. The GPU 104 may be configured to operate as discussed above. In particular, the GPU may execute GPU code $103_G$, which may implement shaders, such as compute shaders CS, vertex shaders VS, and pixel shaders PS, as discussed above. To facilitate passing of data between the compute shaders CS and the vertex shaders VS the system may include one or more buffers 105, which may include a frame buffer FB. The GPU code $103_G$ may also optionally implement other types of shaders (not shown), such as pixel shaders or geometry shaders. Each compute unit may include its own dedicated local memory store, such as a local data share. The GPU 104 may include one or more texture units 106 configured to perform certain operations for applying textures to primitives as part of a graphics pipeline.

According to aspects of the present disclosure a pixel shader PS and a texture unit 106 are configured to generate one or more texture coordinates UV and potentially also texture space gradient values for each coordinate Gr, for one or more corresponding pixel sample locations. These gradient values may potentially be corrected for non-orthonormality of the sample grid. While these gradient values Gr provide locally correct texture filtering, in some configurations, there may be abrupt transitions between screen areas having different pixel sample configurations which may become visible in the output image as an abrupt change in texture filtering appearance. According to aspects of the present disclosure a pixel shader PS may calculate and supply the texture unit 106 with screen space gradient scale factors Sc which the texture unit 106 may apply as a linear screen axis aligned scale transformation to the gradients Gr to obtain adjusted gradient values Gr'. These gradient scale factors Sc may be used to modify the gradient values Gr progressively leading up to a screen area boundary in order to smoothly transition them between regions of the display device 116 having different pixel resolutions.

By way of example, and not by way of limitation, the texture units 106 may be implemented as special purpose hardware, such as an application-specific integrated circuit (ASIC), Field Programmable Gate Array (FPGA), or a system on chip (SoC or SOC).

As used herein and as is generally understood by those skilled in the art, an application-specific integrated circuit (ASIC) is an integrated circuit customized for a particular use, rather than intended for general-purpose use.

As used herein and as is generally understood by those skilled in the art, a Field Programmable Gate Array (FPGA) is an integrated circuit designed to be configured by a customer or a designer after manufacturing—hence "field-programmable". The FPGA configuration is generally specified using a hardware description language (HDL), similar to that used for an ASIC.

As used herein and as is generally understood by those skilled in the art, a system on a chip or system on chip (SoC or SOC) is an integrated circuit (IC) that integrates all components of a computer or other electronic system into a single chip. It may contain digital, analog, mixed-signal, and often radio-frequency functions—all on a single chip substrate. A typical application is in the area of embedded systems.

A typical SoC includes the following hardware components:

One or more processor cores (e.g., microcontroller, microprocessor or digital signal processor (DSP) cores.

Memory blocks, e.g., read only memory (ROM), random access memory (RAM), electrically erasable programmable read-only memory (EEPROM) and flash memory.

Timing sources, such as oscillators or phase-locked loops.

Peripherals, such as counter-timers, real-time timers, or power-on reset generators.

External interfaces, e.g., industry standards such as universal serial bus (USB), FireWire, Ethernet, universal asynchronous receiver/transmitter (USART), serial peripheral interface (SPI) bus.

Analog interfaces including analog to digital converters (ADCs) and digital to analog converters (DACs).

Voltage regulators and power management circuits.

These components are connected by either a proprietary or industry-standard bus. Direct Memory Access (DMA) controllers route data directly between external interfaces and memory, bypassing the processor core and thereby increasing the data throughput of the SoC.

A typical SoC includes both the hardware components described above, and executable instructions (e.g., software or firmware) that controls the processor core(s), peripherals and interfaces.

According to aspects of the present disclosure, some or all of the functions of the texture units 106 may alternatively be implemented by appropriately configured software instructions executed by a software programmable general purpose computer processor. Such instructions may be embodied in a computer-readable medium, e.g., memory 108 or storage device 115.

The system 100 may also include well-known support functions 110, which may communicate with other components of the system, e.g., via the bus 109. Such support functions may include, but are not limited to, input/output (I/O) elements 111, power supplies (P/S) 112, a clock (CLK) 113 and cache 114. In addition to the cache 114, the GPU 104 may include its own GPU cache $114_G$, and the GPU may be configured so that programs running on the GPU 104 can read-through or write-though the GPU cache $114_G$.

The system 100 may optionally include a mass storage device 115 such as a disk drive, CD-ROM drive, flash memory, tape drive, or the like to store programs and/or data. The system 100 may also optionally include a display device 116 to present rendered graphics 117 to a user and user interface unit 118 to facilitate interaction between the system 100 and a user. The display device 116 may be in the form of a flat panel display, head mounted display (HMD), cathode ray tube (CRT) screen, projector, or other device that can display visible text, numerals, graphical symbols or images. The display 116 may display rendered graphic images 117 processed in accordance with various techniques described herein. The user interface 118 may include a keyboard, mouse, joystick, light pen, game controller, or other device that may be used in conjunction with a graphical user interface (GUI). The system 100 may also include a network interface 120 to enable the device to communicate with other devices over a network 122. The network 122 may be, e.g., a local area network (LAN), a wide area network such as the internet, a personal area network, such as a Bluetooth network or other type of network. These components may be implemented in hardware, software, or firmware, or some combination of two or more of these.

Graphics Pipeline

Figure 1B:
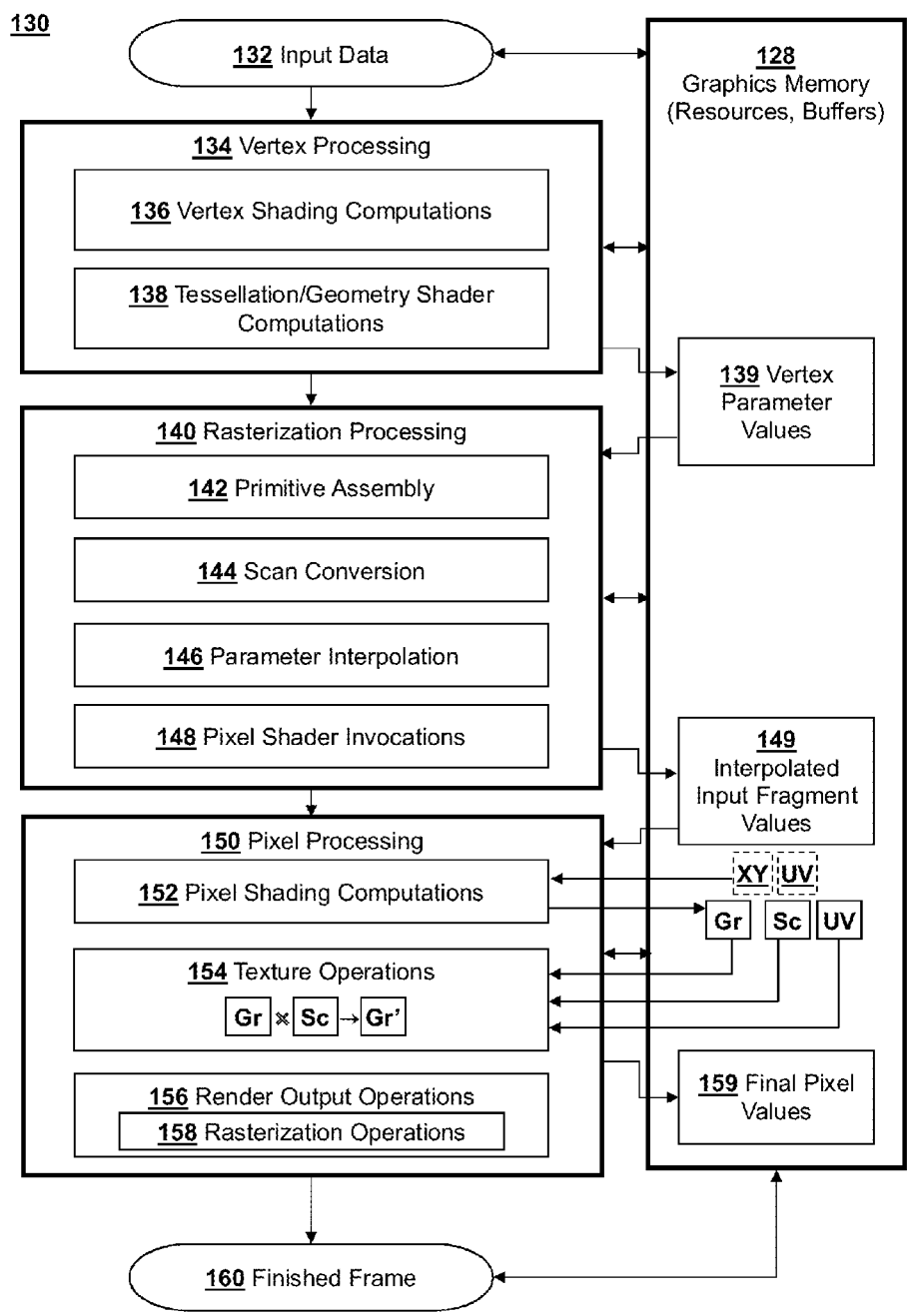
FIG. 1B is a block diagram of a graphics processing pipeline.

According to aspects of the present disclosure, the system 100 is configured to implement portions of a graphics rendering pipeline. FIG. 1B illustrates an example of a graphics rendering pipeline 130 in accordance with aspects of the present disclosure.

The rendering pipeline 130 may be configured to render graphics as images that depict a scene having a two-dimensional, or preferably three-dimensional geometry in virtual space (sometime referred to herein as "world space"). The early stages of the pipeline may include operations performed in virtual space before the scene is rasterized and converted to screen space as a set of discrete picture elements suitable for output on the display device 116. Throughout the pipeline, various resources contained in the graphics memory 128 may be utilized at the pipeline stages and inputs and outputs to the stages may be temporarily stored in buffers contained in the graphics memory before the final values of the images are determined.

The rendering pipeline may operate on input data 132, which may include one or more virtual objects defined by a set of vertices that are set up in virtual space and have geometry that is defined with respect to coordinates in the scene. The early stages of the pipeline may include what is broadly categorized as a vertex processing stage 134 in FIG. 1B, and this may include various computations to process the vertices of the objects in virtual space. This may include vertex shading computations 136, which may manipulate various parameter values of the vertices in the scene, such as position values (e.g., X-Y coordinate and Z-depth values), color values, lighting values, texture coordinates, and the like. Preferably, the vertex shading computations 136 are performed by one or more programmable vertex shaders. The vertex processing stage may optionally include additional vertex processing computations, such as tessellation and geometry shader computations 138 which may be optionally used to generate new vertices and new geometries in virtual space. Once the stage referred to as vertex processing 134 is complete, at this stage in the pipeline the scene is defined by a set of vertices which each have a set of vertex parameter values 139.

The pipeline 130 may then proceed to rasterization processing stages 140 associated with converting the scene geometry into screen space and a set of discrete picture elements, i.e., pixels. The virtual space geometry may be transformed to screen space geometry through operations that may essentially compute the projection of the objects and vertices from virtual space to the viewing window (or "viewport) of the scene. The vertices may define a set of primitives.

The rasterization processing stage 140 depicted in FIG. 1B may include primitive assembly operations 142, which may set up the primitives defined by each set of vertices in the scene. Each vertex may be defined by an index, and each primitive may be defined with respect to these vertex indices, which may be stored in index buffers in the graphics memory 128. The primitives may preferably include at least triangles defined by three vertices each, but may also include point primitives line primitives, and other polygonal shapes. During the primitive assembly stage 142, certain primitives may optionally be culled. For example, those primitives whose indices indicate a certain winding order may be considered to be back-facing and may be culled from the scene.

By way of example, and not by way of limitation, where the primitives are in the form of triangles defined by vertices in three dimensional virtual space, the primitive assembly determines where on the screen of the display 116 each triangle is located. Clipping and screen space transformation operations are typically performed by the primitive assembly unit 142.

After primitives are assembled, the rasterization processing stages may include scan conversion operations 144, which may sample the primitives at each pixel and generate fragments (sometimes referred to as pixels) from the primitives for further processing when the samples are covered by the primitive. The scan conversion operations include operations that take a primitive that has been converted to screen space coordinates and determines which pixels are part of that primitive. In some implementations, multiple samples for each pixel are taken within the primitives during the scan conversion operations 144, which may be used for anti-aliasing purposes. In certain implementations, different pixels may be sampled differently. For example, some edge pixels may contain a lower sampling density than center pixels to optimize certain aspects of the rendering for certain types of display device 116, such as head mounted displays (HMDs). The fragments (or "pixels") generated from the primitives during scan conversion 144 may have parameter values that may be interpolated to the locations of the pixels from the vertex parameter values 139 of the vertices of the primitive that created them. The rasterization stage 140 may include parameter interpolation operations 146 stage to compute these interpolated fragment parameter values 149, which may be used as inputs for further processing at the later stages of the pipeline.

The pipeline 130 may include further pixel processing operations, indicated generally at 150 in FIG. 1B, to further manipulate the interpolated parameter values 149 and perform further operations determining how the fragments contribute to the final pixel values for display. Some of these pixel processing tasks may include pixel shading computations 152 that may be used to further manipulate the interpolated parameter values 149 of the fragments. The pixel shading computations may be performed by a programmable pixel shader, and pixel shader invocations 148 may be initiated based on the sampling of the primitives during the rasterization processing stages 140. The pixel shading computations 152 may output values to one or more buffers 105 in graphics memory 128, sometimes referred to as render targets, or if multiple, as multiple render targets (MRTs).

MRTs allow pixel shaders to optionally output to more than one render target, each with the same screen dimensions but potentially with a different pixel format. Render target format limitations often mean that any one render target can only accept up to four independent output values (channels) and that the formats of those four channels are tightly tied to each other. MRTs allow a single pixel shader to output many more values in a mix of different formats. The formats of render targets are "texture-like", in that they store values per screen space pixel, but, for various performance reasons, render target formats are becoming more specialized in recent hardware generations, sometimes (but not always) requiring what is called a "resolve" to reformat the data before it is compatible with being read in by the texture units 106.

The pixel processing 150 may generally culminate in render output operations 156, which may include what are commonly known as raster operations (ROP). Rasterization Operations (ROP) is simply run multiple times per pixel, once for each render target among the multiple render targets (MRTs). During the output operations 156, the final pixel values 159 may be determined in a frame buffer, which may optionally include merging fragments, applying stencils, depth tests, and certain per sample processing tasks. The final pixel values 159 include the collected output to all active render targets (MRTs). The GPU 104 uses the final pixel values 159 to make up a finished frame 160, which may optionally be displayed on the pixels of the display device 116 in real-time.

The output operations 150 may also include texture mapping operations 154, which may be performed to some extent by one or more pixel shaders PS and to some extent by the texture units 106. The pixel shader computations 152 include calculating texture coordinates UV from screen space coordinates XY, and sending the texture coordinates to the Texture Operations 154, and receiving texture data TX. The texture coordinates UV could be calculated from the screen space coordinates XY in an arbitrary fashion, but typically are calculated from interpolated input values or sometimes from the results of previous texture operations. Gradients Gr are often directly calculated from quads of texture coordinates by the texture units 106 (Texture Operations hardware units), but can optionally be calculated explicitly by the pixel shader computations 152 and passed to the texture operations 154 rather than relying on the texture units 106 to perform the default calculation.

The texture operations 154 generally include the following stages, which can be performed by some combination of a pixel shader PS and a texture unit 106. First, one or more texture coordinates UV per pixel location XY are generated and used to provide a coordinate set for each texture mapping operation. Then, texture space gradient values Gr for pixel sample locations are generated, potentially including corrections for non-orthonormality of the sample grid. Finally, the gradients Gr are modified by per-pixel screen space gradient scale factors Sc supplied by the pixel shader PS in order to produce the final texture space gradients Gr' used for texture filtering operations. The gradient scale factors Sc may be chosen to produce gradient values Gr' which smoothly transition between regions of the display device 116 having different pixel resolutions or sample distributions.

In some implementations, the pixel shader PS can generate the texture coordinates UV and gradient scale factors Sc per pixel location XY and provide a coordinate set for each texture mapping operation to the texture unit 106, which may generate texture space gradient values Gr and modify them to produce corrected texture space gradient values Gr'.

In other implementations, the pixel shader PS could calculate the texture space coordinates UV, explicit differences Gr from the pixel locations XY, and gradient scale factors Sc and pass all of these values to the texture unit 606 and indicate to the texture unit 606 that it must still perform any corrections for non-orthonormality normally, then apply the gradient scale factors Sc to get the adjusted gradient values Gr'.

In other alternative implementations, the pixel shader PS could calculate the texture space coordinates UV and explicit corrected gradients Gr' and pass those to the texture unit, indicating to the texture unit 106 that any required corrections have already been applied in software and that the corrected gradients Gr' should be used as is to select the LOD.

Per-Pixel Gradient Adjustment

Figure 2E:
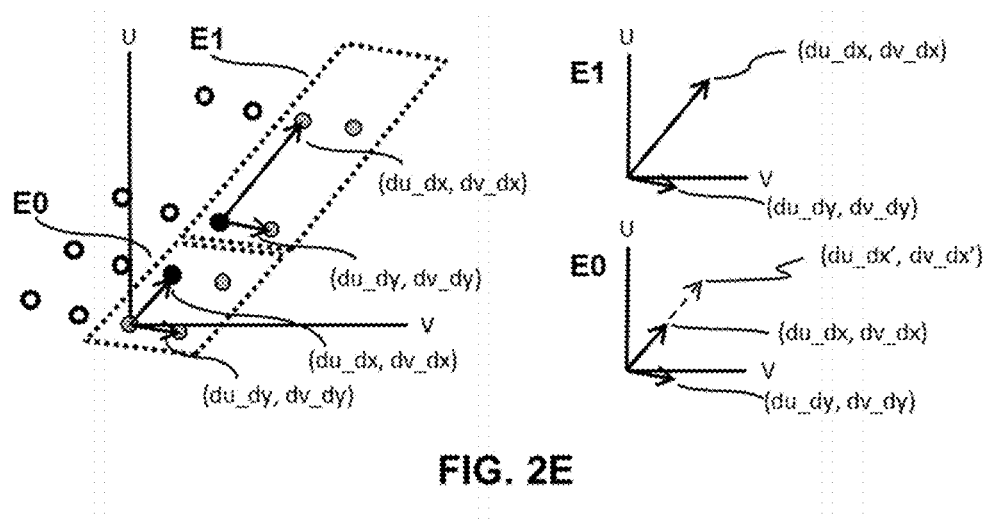
FIG. 2E illustrates a generalized example of per-pixel gradient scale correction in accordance with an aspect of the present disclosure.

Aspects of the present disclosure are directed to adjustment of gradients Gr used by the texture unit 106 to determine the mipmap level (LOD) for a texture to be applied to a primitive in the graphics pipeline. The basic concept is illustrated in FIG. 2E. FIG. 2E depicts the texture UV coordinates of four pixel samples in two orthogonal quads (E0 and E1). In quad E0, all samples points in XY space lie on an orthonormal grid with spacing of one screen pixel horizontally and vertically.

In quad E0, texture gradients Gr in UV space are trivially computed from the texture coordinates UV. The texture gradients Gr may be expressed mathematically in terms of the texture coordinates UV of the upper left, upper right and lower left pixels, respectively (u0, v0), (u1, v1) and (u2, v2), as follows:

$du\_dx = u1 - u0$ $dv\_dx = v1 - v0$ $du\_dy = u2 - u0$ $dv\_dy = v2 - v0$

These calculations of du_dx=u1−u0, etc. can be performed by the texture unit hardware 106 if the pixel shader PS does not choose to override them with software calculated values. The texture gradients Gr are then used by the texture unit 106 to determine the mipmap LOD level to sample.

According to aspects of the present disclosure the gradients Gr du_dx, dv_dx, du_dy, dv_dy are adjusted on a per-pixel basis to account for discontinuities in pixel resolution across a display. For example, in certain display configurations (e.g., head mounted display (HMD) applications), it is advantageous to use different resolutions for different parts of the display. In such cases it is very advantageous to scale the gradients on a per-pixel basis to smooth out the change in texture filtering at or near boundaries between adjacent regions of different resolution. The basic concept is illustrated in FIGS. 2A-2C.

As shown in FIG. 2A and FIG. 2B the display area may be divided into two or more regions 201, 202, 203, 204, 205, 206, 207, 208, and 209 of different pixel resolution. Each region may have a resolution that is related to the solid angle subtended by the region of the display, e.g., in the case of a head mounted display (HMD). By way of example, and not by way of limitation, the central region 205 may have a nominal or standard pixel resolution $R_0$. Edge regions 202, 204, 206, 208 could have half the standard resolution $\frac{1}{2}R_0$, e.g., half the pixels in these regions would be "turned off" or not rendered on the display. Corner regions 201, 203, 207, and 209 could have on quarter the standard resolution $\frac{1}{4}R_0$, e.g., three quarters of the pixels in these regions would be "turned off" or not rendered on the display. FIG. 2B shows these different regions drawn to different sizes according to the resolution of each region.

Gradients might need to be adjusted for pixels near the boundaries between adjacent regions. For example, in FIG. 2C the lines marking the boundaries between the sections have been removed. However, discontinuities in texture filtering between neighboring regions make the boundaries visible. The GPU can be configured to adjust gradients for pixels near the boundaries between regions to smooth out the discontinuities, making them less visible. For example, as shown in FIG. 2D, horizontal gradients for selected pixels 211,212 in the full resolution central region 205 in the row D-D' in FIG. 2C can be scaled so as to produce progressively blurrier texture filtering towards the half resolution edge regions 204, 206, such that two pixels immediately adjacent across the border would access approximately the same MIP LOD level.

Alternatively, gradients in the half resolution edge regions 204,206 may also be scaled so as to become progressively sharper towards the full resolution central region 205.

Generalized adjustment of the gradients to account for differing resolution can be understood with reference to FIG. 2E, which depicts in UV space the texture coordinates for two adjacent quads of pixels E0 and E1 across a boundary in horizontal screen area, also indicated by the correspondingly labeled rectangles in screen space in FIG. 2C. In FIG. 2E, the halving of the horizontal density of samples between E0 and E1 produces (du_dx, dv_dx) for E1 that have approximately twice the length of the (du_dx, dv_dx) calculated for E0. This may in turn result in selection of a lower level of detail for quad E1 than for E0. It should be noted that these gradient calculations for quad E0 and quad E1 are locally correct, in that each would correctly select a mipmap LOD that would cover each screen pixel with approximately one texture pixel ("texel"), but that this abrupt change in texture filtering may produce a visible change in the appearance of the output image across the boundary between quads with sample patterns like E0 and those with patterns like E1. The visibility of this boundary may be reduced by choosing to adjust gradient values in pixels near to the boundary in order to produce a smoothly varying selection of mipmap LOD.

Gradients in UV space (du_dx, dv_dx), (du_dy, dv_dy) are calculated normally for each quad, which might in some other cases include corrections for non-orthonormality of the local sample distribution. The gradients can then be multiplied by per-pixel gradient scale factors scaleX, scaleY on a per-pixel basis to produce the final adjusted gradients (du_dx', dv_dx'), (du_dy',dv_dy') that the texture unit uses to determine the appropriate mipmap level:

$$du\_dx'=du\_dx*scaleX$$

$$du\_dy'=du\_dy*scaleY$$

$$dv\_dx'=dv\_dx*scaleX$$

$$dv\_dy'=dv\_dy*scaleY$$

The gradient scale factors scaleX and scaleY, would be calculated by the pixel shader PS and passed to the texture unit 106, which would use them to calculate the final adjusted gradients.

It should be understood that the above gradient scale correction is applied identically to each texture coordinate U and V, and so can be extended trivially to 1 dimensional coordinates (U), 2 dimensional coordinates (UV), or 3 dimensional coordinates (UVW).

Suitable values for gradient scale factors scaleX, scaleY can be determined empirically by iterating the gradient scale factor values applied to selected pixels proximate the boundaries of neighboring regions of different pixel resolution. A range of suitable values for the gradient scale factors can be determined from the relative pixel resolutions of the neighboring regions. For example, along row D-D' the pixel resolution changes from ½R in region 204 to R in region 205 and again to ½R in region 206. The gradient scale value scaleX would transition from roughly 1 to roughly 2 over several pixels in region 205 proximate the boundaries with regions 204 and 206. In FIG. 2E, it can be seen that applying a gradient scaleX factor of 2 to quad E0 from region 205 would result in (du_dx', dv_dx') which roughly match the gradients calculated for adjacent quad E1 from region 206, thus creating continuity in the scale corrected gradients and texture filtering LOD selection. Similarly, gradient scale values scaleX, scaleY would transition from a value of roughly 1 to a value of roughly 2 over several pixels in region 208 proximate the boundaries with regions 207 and 209. The gradient scale factors may be varied between the two values over several pixels, e.g., roughly 4 to 8 pixels.

The texture unit 106 may use the final adjusted gradients to select the appropriate LOD to apply to one or more primitives from the final adjusted gradients.

Additional Aspects

An additional aspect of the present disclosure include a graphics processing method, comprising: receiving or generating one or more sets of texture coordinates per pixel sample location; calculating texture space gradient values for one or more primitives; and generating and applying per-pixel gradient scale factors configured to modify the gradient values to smoothly transition them between regions of a display device having different pixel resolutions.

Another additional aspect is a graphics processing system configured to implement the forgoing method.

Yet another additional aspect is a computer-readable medium having computer executable instructions embodied therein that, when executed, implement the foregoing method.

A further aspect is an electromagnetic or other signal carrying computer-readable instructions for performing the foregoing method.

Another further aspect is a computer program product downloadable from a communication network and/or stored on a computer-readable and/or microprocessor-executable medium, characterized in that it comprises program code instructions for implementing the foregoing method.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A computer graphics system, comprising:
   a graphics processing unit (GPU) having a pixel shader and a texture unit;
      wherein the pixel shader is configured to receive or generate one or more sets of texture coordinates per pixel sample location and wherein the pixel shader and texture unit between them are configured to calculate texture space gradient values for one or more primitives, and generate and apply per-pixel gradient scale factors configured to modify the gradient values to transition them between regions of a screen space of a display device having different pixel resolutions, wherein the regions of the display device having different pixel resolutions include at least one region of the display device for which fewer available pixels are rendered than for other regions of said display device.

2. The system of claim 1, wherein the texture space gradient values include corrections for non-orthonormality of a screen space sample distribution.

3. The system of claim 1, wherein the texture unit is an application specific integrated circuit (ASIC), field programmable gate array (FPGA), or system on chip (SOC).

4. The system of claim 1, wherein the texture unit is further configured to select a level of detail from a plurality of levels of detail for a texture to be applied to one or more primitives from the adjusted gradient values.

5. The system of claim 4, wherein the texture unit is further configured to apply the texture to the one or more primitives.

6. The system of claim 5, further comprising a display unit coupled to the GPU, wherein the display unit is configured to display images that include the texture applied to the one or more primitives.

7. The system of claim 1, wherein the texture unit calculates texture space gradient values from the texture coordinates supplied by the pixel shader and generates and applies the per-pixel gradient scale factors to obtain scale corrected gradient values.

8. The system of claim 1, wherein the pixel shader calculates the per-pixel gradient scale factors and provides them to the texture unit with the texture coordinates.

9. The system of claim 8, wherein the texture unit calculates texture space gradient values from the texture coordinates supplied by the pixel shader and then applies the supplied gradient scale factors to the texture space gradients to obtain adjusted gradient values.

10. The system of claim 1, wherein the pixel shader calculates the texture space gradients from the texture coordinates and passes them with the texture coordinates to the texture unit, wherein the pixel shader indicates to the texture unit that the texture unit must correct the texture gradient values for any non-orthonormality of the sample grid.

11. The system of claim 10, wherein the pixel shader also determines the per-pixel gradient scale factors and provides them to the texture unit, wherein the pixel shader notifies the texture unit that the texture unit must apply the gradient scale factors to the gradients to obtain the adjusted gradients.

12. The system of claim 1, wherein the pixel shader calculates the adjusted texture gradients from the texture coordinates and passes them along with the texture space coordinates to the texture unit, wherein the pixel shader indicates to the texture unit that the adjusted gradients should be used as is to select a level of detail for a texture to be applied to a primitive.

13. In a computer graphics processing unit (GPU) having a pixel shader and a texture unit, the texture unit being implemented in hardware, a graphics processing method, comprising:
   the pixel shader generating one or more texture coordinates per pixel location to provide a coordinate set for one or more texture mapping operations;
   between the pixel shader and texture unit calculating gradient values from the texture coordinates;
   between the pixel shader and texture unit determining gradient scale factors configured to adjust corresponding gradient values to corresponding adjusted gradient values and
   between the pixel shader and texture unit applying the gradient scale factors to the gradient values, wherein the adjustment factors are configured to modify the gradient values to transition them between regions of a screen space of a display device having different pixel resolutions, wherein the regions of the display device having different pixel resolutions include at least one region of the display device for which fewer available pixels are rendered than for other regions of said display device.

14. The method of claim 13, wherein the texture space gradient values include corrections for non-orthonormality of a screen space sample distribution.

15. The method of claim 13, further comprising selecting a level of detail from a plurality of levels of detail for a texture to be applied to one or more primitives from the adjusted gradient values with the texture unit.

16. The method of claim 13, further comprising, applying the texture to the one or more primitives with the texture unit.

17. The method of claim 16, further comprising displaying images that include the texture applied to the one or more primitives with a display unit.

18. The method of claim 17, wherein the pixel shader generates the texture coordinates per pixel location and provides a coordinate set for each texture mapping operation to the texture unit.

19. The method of claim 18, wherein the texture unit calculates texture gradients from the texture coordinates supplied by the pixel shader, and generates and applies the gradient scale factors to obtain the corrected gradient values.

20. The method of claim 13, wherein the pixel shader calculates the gradient scale factors and provides them to the texture unit with the texture coordinates.

21. The method of claim 20, wherein the texture unit calculates texture space gradient values from the texture coordinates supplied by the pixel shader, and then applies the supplied gradient scale factors to the texture space gradients to obtain adjusted gradient values.

22. The method of claim 13, wherein the pixel shader calculates the texture space gradients from the texture coordinates and passes them with the texture coordinates to the texture unit, wherein the pixel shader indicates to the texture unit that the texture unit must correct the texture gradient values for any non-orthonormality of the sample grid.

23. The method of claim 22, wherein the pixel shader also determines the gradient scale factors and provides them to the texture unit, wherein the pixel shader notifies the texture unit that the texture unit must apply the gradient scale factors to the gradients to obtain the adjusted gradients.

24. The method of claim 13, wherein the pixel shader calculates the adjusted texture gradients from the texture coordinates and passes them along with the texture space coordinates to the texture unit, wherein the pixel shader indicates to the texture unit that the adjusted gradients should be used as is to select a level of detail for a texture to be applied to a primitive.

* * * * *